C. W. Isbell.
Rotary Pump.

No. 98,772. Patented Jan. 11, 1870.

Witnesses.
JM Coombs
Fred Haynes

Inventor.
Chas. W. Isbell

UNITED STATES PATENT OFFICE.

CHARLES W. ISBELL, OF NEW YORK, N. Y.

Letters Patent No. 98,772, dated January 11, 1870; antedated January 6, 1870.

IMPROVEMENT IN ROTARY PUMPS.

The Schedule referred to in these Letters Patent and making part of the same.

*To all whom it may concern:*

Be it known that I, CHARLES W. ISBELL, of the city, county, and State of New York, have invented a new and useful Improvement in Pumping or Blowing-Machines, applicable, also, to other purposes, of which the following is a full, clear, and exact description, reference being had to the accompanying drawing, forming part of this specification, and in which—

Figure 3:
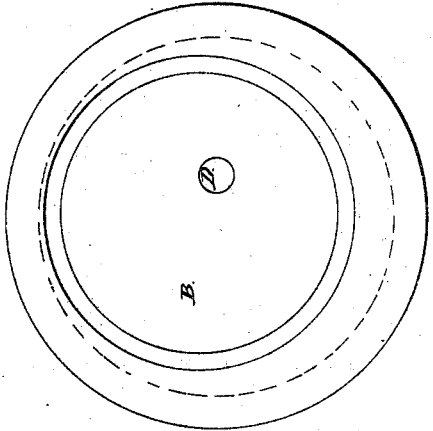
Figure 2:
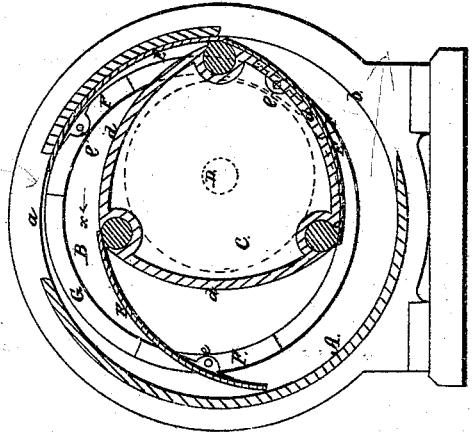
Figure 1:
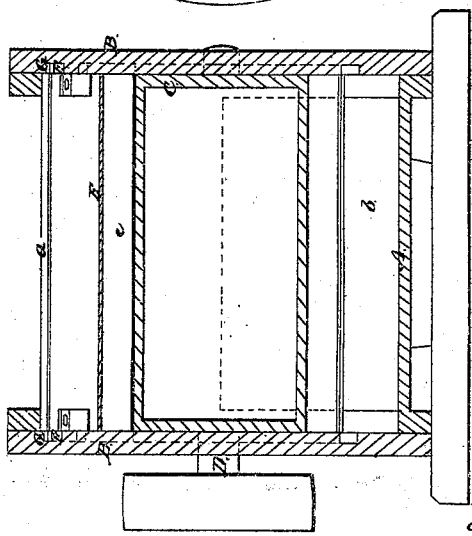

Figures 1 and 2 represent sectional elevations, at right angles to each other, of a pump or blower, constructed in accordance with my improvement, and Figure 3, an interior face view of one of the ends or covers to the outer case or cylinder.

Similar letters of reference indicate corresponding parts.

My improvement relates to machines of a rotary character, for pumping, blowing, and other purposes, in which there is arranged within an outer cylinder, provided with suitable inlet and outlet-openings in or near its periphery, a rotating carrier, that has its axis eccentric to that of the cylinder, and that has hinged to it a series of buckets or blades, which, during their rotation in common with the carrier, open and close, relatively to the latter, to receive and discharge the air or fluid.

The invention, in this connection, consists—

First, in the construction of the hinged blades, of a curvature corresponding to that of the outer case or cylinder.

Secondly, in the construction of the revolving eccentric carrier, of a series of similar sweeps or curves. By this construction of the blades and carrier, waste or leakage is prevented back, past, or over the blades, and the same made self-packing, or presenting such extended outer surface as that packing may be dispensed with; also, air or fluid, received through the inlet, is prevented from being worked around with the carrier, and its delivery at the outlet made positive or certain; likewise an increased capacity secured for or to the buckets.

Thirdly, the invention consists in a combination, with the hinged blades, of shoes, pivoted to the blades, near their side edges, in rear of their front edges, and arranged to travel in grooves cut in the ends or covers of the outer case, to direct the blades in their opening and closing actions, and relieve them from frictional contact with the outer case; also to prevent the front edges of the blades from impinging on or against the periphery of said case.

This latter feature of the invention is only applicable when the machine is driven by power applied to the carrier-shaft, as when working it as a pump or blower. When operated by the weight or pressure of the fluid passing through it, which drives it in an opposite direction, and requires a reversed position of the inlet and outlet, as in working it as a water-propelled engine or meter, then the grooves and guiding-shoes may be dispensed with, and the machine preferably arranged so that its main shaft stands vertical.

It will suffice here, however, to describe the invention when used as a pump or blower, and, for the purpose of illustration, I shall select the latter application of it, the *modus operandi* being the same when the machine is used as a pump for working liquids.

Referring to the accompanying drawing—

A is the outer cylinder or case, provided in its periphery with an inlet-opening, $a$, and outlet $b$.

B B are the cylinder ends or covers.

C is the revolving carrier, arranged to extend the length of the cylinder, and secured to a driving-shaft, D, which is eccentric to the cylinder.

This carrier is constructed to carry any desired number of buckets or blades, E E E', jointed or hinged, as at $c\ c\ c$, to the carrier, at an equal distance apart, and at equal distances from the driving-shaft D.

These blades, which are of the same length as the interior of the cylinder A, are preferably made of sheet-metal, and, though attached to an eccentrically-arranged carrier, are of corresponding curvature to that of the cylinder A, so that when the carrier C revolves, as indicated by the arrow $x$, in fig. 2, they lie for their whole length and breadth against the inner periphery of the cylinder A during a large portion of their travel, that is, while they pass from the outlet $b$ to the inlet $a$.

By this curved construction of the blades or buckets, they are made self-packing, or have such an extended outer surface in proximity to the cylinder as to render special packing unnecessary, and air, entering at the inlet $a$, is prevented from leaking back, past, or over them, to the outlet.

The carrier C is also made up of a series of curvatures, $d\ d\ d$, corresponding to, or having the same length of radius as the cylinder A, (less the thickness of the blades,) though struck from different centres around the shaft D, so that when the blades, though of like curvatures to that of the cylinder A, shut down upon the carrier, after they have expelled the air through the outlet $b$, they establish a close fit with or on the carrier throughout their length and breadth, and prevent air from passing around with the carrier, and insure its expulsion through the outlet. Such construction, too, of the carrier-surface, gives larger bucket-space than were the carrier of a cylindrical form.

To insure the timely action of the blades or buckets, as regards their opening and closing to receive and discharge the air, and to make at intervals, as described, a close fit throughout their length and breadth with the cylinder and carrier working therein, I pivot to said blades, at or near their side edges, and in rear of their front edges, as at e e e, shoes F F F, which are arranged to travel in suitable eccentric-shaped grooves, G G, cut or formed in the inner faces of the cylinder-covers. These shoes, through the aid of the eccentric grooves, direct the opening and closing action of the blades, and relieve them from friction on or against the outer cylinder or case. By the pivoted arrangement of said shoes in rear of the front edges of the blades, the latter are prevented from impinging or digging, as it were, when assuming certain angles or positions, into the periphery of the outer cylinder, and thus sticking is avoided.

What is here claimed, and desired to be secured by Letters Patent, is—

1. The combination, with the outer cylinder or case A, and eccentrically-hung rotating carrier D therein, of the buckets or blades E E, hinged to said carrier, but of curvatures, on their outer surfaces, corresponding to that of the cylinder, substantially as specified.

2. The combination, with the outer cylinder or case A, of the eccentrically-hung rotating carrier D, made up of a series of curves on its face, corresponding to that of the cylinder, less the thickness of the blades, hinged to said carrier, essentially as shown and described.

3. The combination, with the guiding-grooves G in the cylinder ends or covers, of the pivoted shoes F to the side edges of the blades or buckets, arranged to direct said blades, substantially as herein set forth.

CHAS. W. ISBELL.

Witnesses:
FRED. HAYNES,
J. W. COOMBS.